April 5, 1955 R. U. STRANDBERG 2,705,430
ADJUSTABLE SAW SHARPENER
Filed July 9, 1952
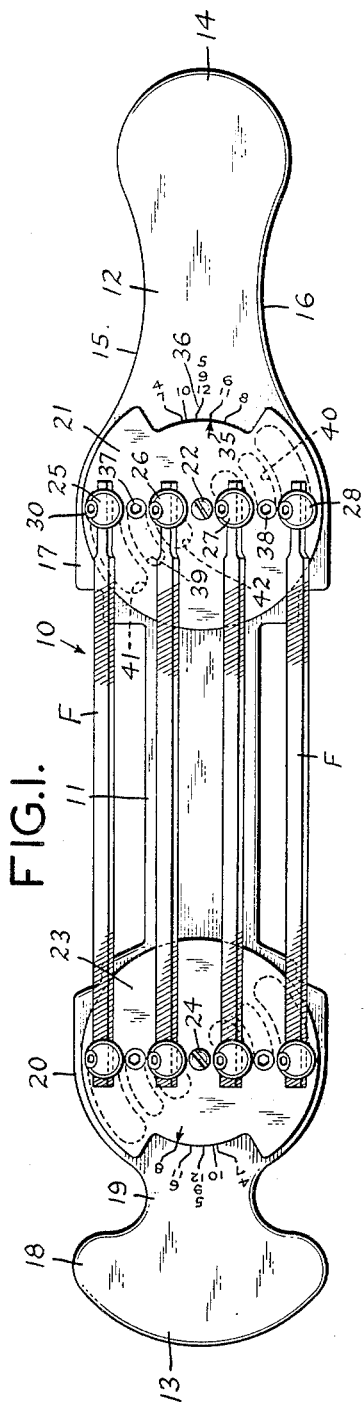
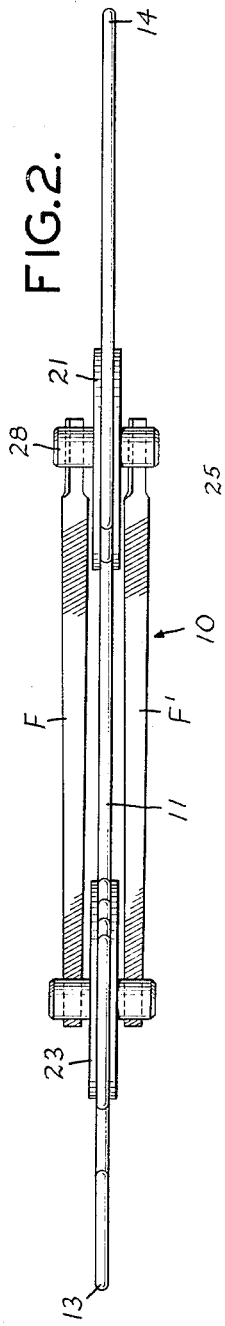
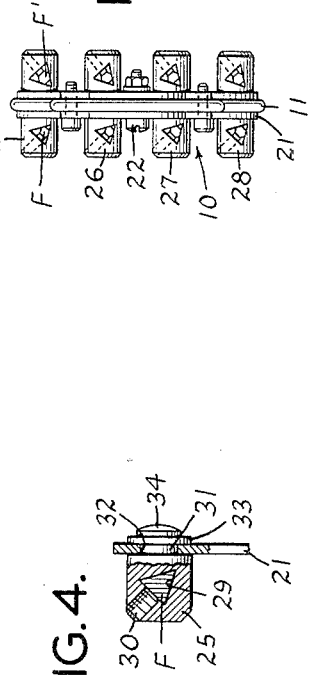
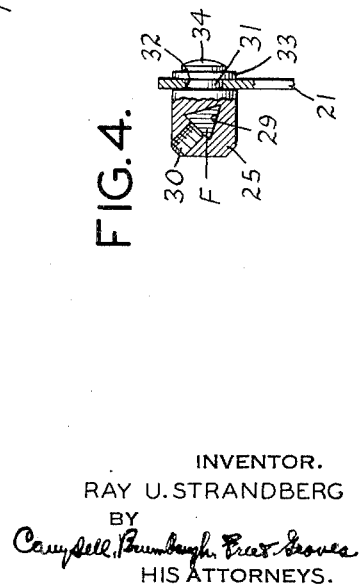
INVENTOR.
RAY U. STRANDBERG
BY
*Campbell, Brumbaugh, Free & Graves*
HIS ATTORNEYS.

United States Patent Office

2,705,430
Patented Apr. 5, 1955

2,705,430

ADJUSTABLE SAW SHARPENER

Ray U. Strandberg, Brooklyn, N. Y.

Application July 9, 1952, Serial No. 297,836

5 Claims. (Cl. 76—36)

This invention relates to improvements in tools for sharpening saws and it relates particularly to a saw sharpening device or tool which is adjustable to correspond to saws having different tooth sizes and tooth spacings to enable the tool to be used for sharpening many of the usual types of hand saws and the like.

Devices have been provided heretofore for sharpening hand saws in which a plurality of saw sharpening files are mounted on a handle to enable a plurality of saw teeth to be filed simultaneously. Some of the prior types of saw sharpening devices have provided means for adjusting the spacing between the files to accommodate them to different tooth spacings of the saws. However, the adjusting mechanism for the spacing of the files has been cumbersome and difficult to adjust accurately because no means has been provided for gauging accurately the spacing between the files.

The sharpening tool embodying the present invention provides a supporting mechanism for a plurality of saw files in which the files are held in parallel relation and can be moved simultaneously and equally toward or away from each other while maintaining parallelism between them to adjust them accurately for sharpening saws having different tooth sizes and tooth spacings.

More particularly, the new tool may include a handle or manipulating member having a shank or supporting bar on which are mounted a pair of angularly adjustable or rotatable supporting members. Each of the supporting members is provided with relatively rotatable elements for gripping the ends of separate files. The spacing and arrangement of the gripping elements is such that the files are supported in parallel relationship. By angular adjustment or rotation of the supporting elements on which the gripping elements are mounted, the files can be moved closer together or farther apart, simultaneously, while maintaining them parallel.

The tool may be provided with suitable scale markings and indicators calibrated in terms of tooth spacing so that adjustment of the angularity of the supporting elements for the files enables the spacing of the files to be adjusted accurately and with a minimum of difficulty.

For a better understanding of the present invention, reference may be had to the accompanying drawing, in which:

Fig. 1 is a plan view of a typical saw sharpening tool embodying the present invention;

Fig. 2 is a view in side elevation of the tool;

Fig. 3 is an end view of the tool looking toward the left-hand end of the tool; and Fig. 4 is a view partially in section and partially broken away of one of the clamping elements for receiving and gripping the end of a file.

As shown in Fig. 1 of the drawing, the tool 10 may include a generally rectangular, substantially rigid, shank portion 11 formed of sheet metal or the like and having at one end a handle portion 12 and at the other end a hand grip portion 13. The shapes of the handle portion 12 and the hand grip 14 are relatively unimportant but as illustrated, the outer end 14 of the hand grip portion 12 is semicircular in configuration and merges into two concavely curved edge portions 15 and 16 which terminate in a relatively wider inner mounting or base portion 17 at the right-hand end of the shank 11.

The hand grip portion 13 is, as illustrated in Fig. 1, in the form of an enlarged flat, rounded head 18 joined by a narrower neck 19 to an enlarged semicircular mounting or base portion 20 at the left-hand end of the shank 11. In use, the handle portion 12 is gripped by one hand while the hand grip 13 is gripped by the other hand to facilitate manipulation of the tool.

The tool illustrated herein is adapted to receive two groups of files F and F' which may be of any suitable type commonly used for sharpening and straightening the teeth of saws. The files F and F' are supported in groups of four on opposite sides of the shank 11. Inasmuch as the supporting and adjusting mechanisms for each group of files are similar, only one of them will be described herein.

Referring now to Figs. 1 and 2, the base portion 17 at the right-hand end of the shank 11 carries a disc-like, file supporting member 21 for rotation about an axis perpendicular to the shank and passing through the center of the disc 21. The disc 21 is supported for rotation by means of a bolt 22 or the like which extends through the base portion 17 perpendicular to its plane.

The base portion 20 at the opposite end of the tool also supports another disc-like member 23 for rotation on a bolt 24 or the like having its axis perpendicular to the base portion 20. Each of the supporting members 21 and 23 is provided with a row of clamping elements or sockets 25, 26, 27 and 28 of similar construction. The rows of clamping elements extend substantially diametrically across the supporting members 21 and 23. The clamping element 25, for example, consists of a generally cylindrical piece of metal having a triangular opening 29 extending therethrough to receive the tang of a file. The end of the file is clamped in the opening 29 by means of a set screw 30 extending diagonally into the clamping member from the upper end thereof. Each of the clamping members, for example, the clamping member 25, shown in Fig. 4 is supported for rotation about its axis on a corresponding supporting plate 21 or 23. The clamping member 25 has a reduced extension 31 thereon which is received rotatably in a hole 32 in the supporting plate 21. The clamping member 25 is held in position by means of a washer 33 engaging the end of the extension 31 and the underside of the supporting plate 21. The washer 33 is secured to the end of the extension 33 by means of a screw 34 threaded into the extension 31.

The spacing between the several clamping elements 25 to 28 in each row is such that the files F when engaged in the clamping elements are held in equally spaced, parallel relation. The arrangement of the rows of clamping elements 25 to 28 and the files F is such as to provide a parallelogram system capable of angular adjustment. Upon rotation of the supporting members 17 and 21 clockwise or counterclockwise from the position shown in Fig. 1, the files will be moved closer together while still remaining parallel. In this way, the spacing between the files can be adjusted to correspond to the variations in tooth spacing and in the size of the teeth of saws of various type.

The files do not necessarily engage adjacent teeth of a saw. Ordinarily they will be spaced so that they can engage every other tooth or every third tooth of the saw.

To facilitate adjustment of the files for variation in tooth sizes and spacings, each of the discs 21 and 23 may be provided with an indicating mark or pointer 35 cooperating with a scale 36 on the corresponding base portion 17 or 20. One scale 36 is calibrated in terms of tooth spacings for straightening the teeth of the saw and the other scale may be suitably calibrated for sharpening the teeth of the saw. Adjustment of the indicators along the scales will automatically position the files in a proper relationship for straightening the teeth and thereafter filing saws having the corresponding tooth spacing.

The supports for the files F' on the underside of the shank, as viewed in Fig. 2, are similar as the supports for the files F on the upper side of the tool shank. One set of files may be used for straightening the teeth and the other set for sharpening the teeth. To adjust the spacings of the files on both sides automatically and simultaneously, the upper and lower supporting elements for the files may be connected together by means of bolts 37 and 38 which extend through arcuate slots 39 and 40 in the base portions 17 and 20 of the tool. Also, if desired, additional slots 41 and 42 may be provided on opposite sides of the centers of the base portions 17 and 20 to receive the heads of the screws 34 and thereby avoid rubbing and binding of the adjusting members against the shank. Upon adjustment of the spacing of the files, as described above, the angular positions of the supporting plates 17 and 20 may be fixed by tightening the screws 22 and 24 and/or the bolts 37 and 38 so that the spacing of the files is maintained until further adjustment is required. Other suitable locking means may be provided if desired.

While the invention has been descibed with reference to the use of eight files in groups of four on the tool, it will be understood that fewer than four files or more than four files may be mounted for adjustment on each side of the tool. Also, if desired, the files and their corresponding supporting and adjusting means may be omitted from one side of the tool. It will be understood, also, that the shape of the hand grip portions and the handle on the tool, as well as the shape of the shank and the supporting elements 21 and 23 may be modified substantially without departing from the invention. Therefore, the above-described form of the invention should be considered as illustrative and not as limiting the scope of the following claims.

I claim:

1. A saw sharpening tool comprising an elongated shank member having a hand grip at one end, supporting members in spaced apart relation lengthwise of and pivotally mounted on said member for angular movement on said shank member on parallel axes substantially perpendicular to the elongated member, rotatable elements mounted on said supporting members to releasably engage the opposite ends of a plurality of files and retain them in parallel relation, said supporting members being movable angularly with respect to said manipulating member to vary the spacing between said files, and means to retain said supporting members against angular movement.

2. A saw sharpening tool comprising an elongated shank member having a hand grip at one end, supporting members in spaced apart relation lengthwise of and mounted on said shank member for angular movement about axes substantially perpendicular to said shank member, clamping means rotatably mounted on each of said supporting members to releasably grip the opposite ends of at least two files and retain them in parallelism, and substantially parallel to said shank member, said supporting members being movable angularly to vary the spacing between said files, and means to retain said supporting members against angular movement.

3. A saw sharpening tool comprising an elongated member having hand grips at its opposite ends, a pair of supporting members in spaced apart relation lengthwise of said elongated member, pivot means connecting said supporting members to said elongated member for angular adjustment relative to each other and to said elongated member about axes substantially perpendicular to said elongated member, means rotatably mounted on one of said supporting members to releasably grip one end of each of a plurality of files, means rotatably mounted on the other supporting member to releasably grip the other ends of said files and retain them in substantially parallel relation with each other and said elongated member the angular adjustment of said supporting members varying the spacing between said files, and means to lock said supporting members in their angularly adjusted positions.

4. A saw sharpening tool comprising a handle having an elongated shank extending therefrom, a pair of supporting plates mounted on said shank for angular adjustment relative thereto around spaced apart axes substantially perpendicular to said shank, at least two clamping elements rotatably mounted on one of said plates substantially perpendicular thereto, each of said clamping elements having means to receive and releasably retain one end of a file, at least two clamping elements on the other supporting plate substantially perpendicular thereto, each of the last-mentioned clamping elements having means to receive and releasably retain the other end of a file to hold the files in substantial parallelism and substantially parallel with said shank, said supporting plates being angularly adjustable to vary the spacing between said files, means to fix said supporting plates against angular movement relative to said shank, and cooperating means on said shank and at least one said supporting plate to indicate the spacing between said files.

5. A saw sharpening tool comprising a supporting shank having a hand grip at one end thereof, a pair of substantially disc-shaped members mounted in spaced apart relation on said shank for rotary movement about their centers on axes substantially perpendicular to said shank, a first row of clamping elements extending substantially diametrically of one of said members, said clamping elements being mounted for individual rotation on said one member on substantially equally spaced axes perpendicular to said one member, a second row of clamping elements on the other supporting member, the clamping elements of the second row being mounted for rotation on axes substantially perpendicular to the other supporting member in substantially the same spaced relation as the first row, said first and second rows of clamping elements having means to releasably grip the opposite ends of a plurality of files and hold them in parallel relationship, and means to retain said disc-shaped members against rotation.

References Cited in the file of this patent

UNITED STATES PATENTS

| | | |
|---|---|---|
| 82,240 | Newman | Sept. 15, 1868 |
| 924,134 | Blankenburg | June 8, 1909 |
| 1,906,881 | Olas | May 2, 1933 |